Figure 29:
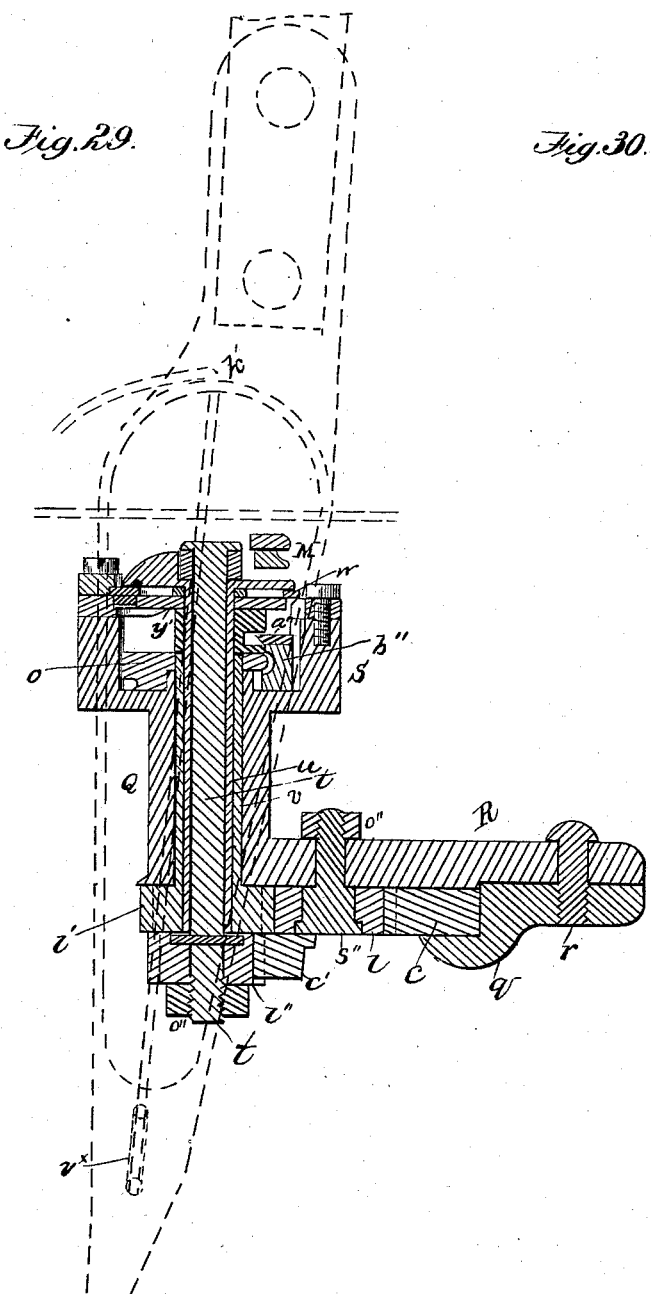

(Model.)
8 Sheets—Sheet 1.
J. F. GORDON.
GRAIN BINDING MACHINE.
No. 269,046. Patented Dec. 12, 1882.
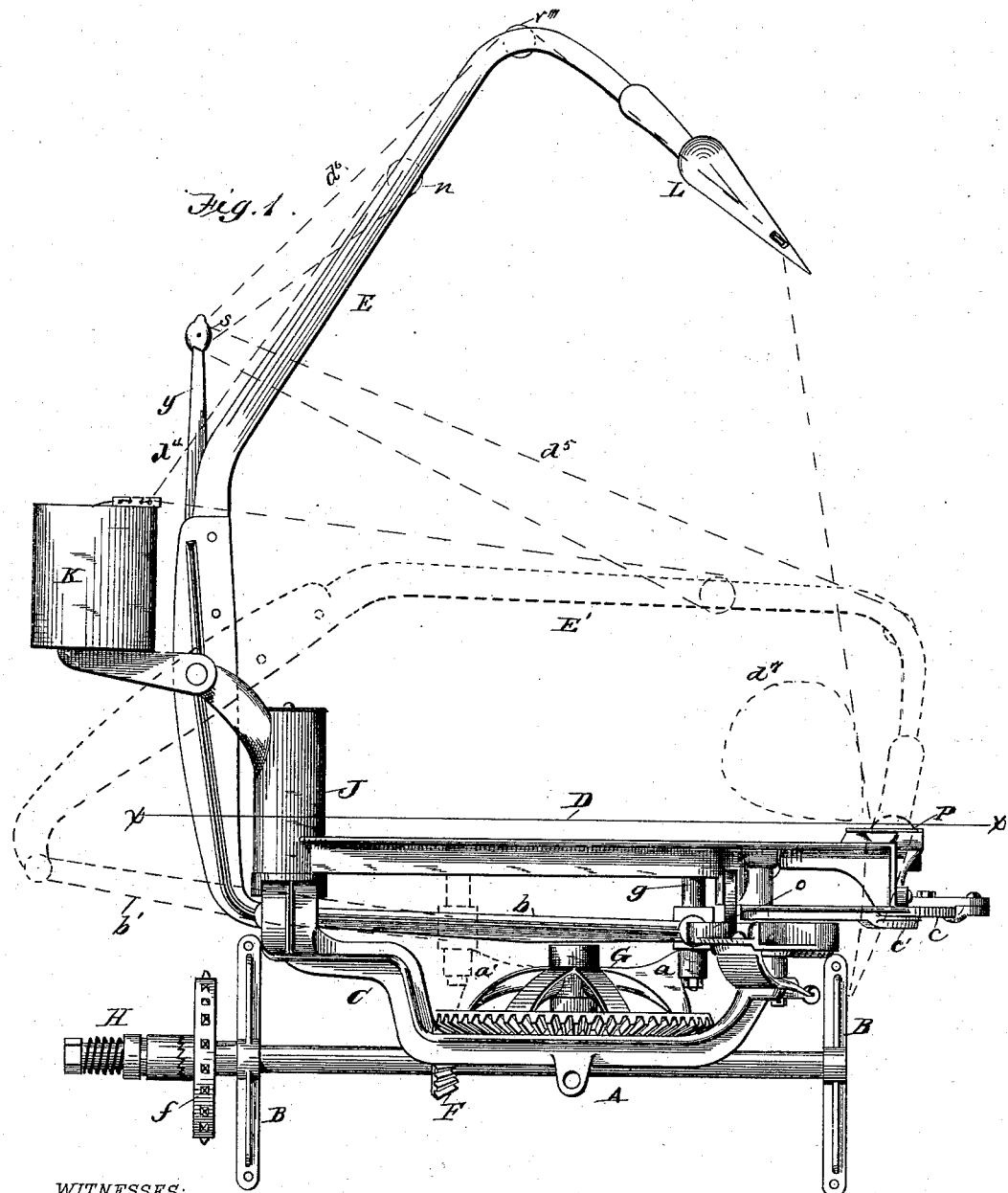
WITNESSES:
W. H. Knight
Newton Wyckoff
INVENTOR
James F. Gordon
By Philip T. Dodge
Attorney (Model.)
J. F. GORDON.
GRAIN BINDING MACHINE.
No. 269,046. Patented Dec. 12, 1882.
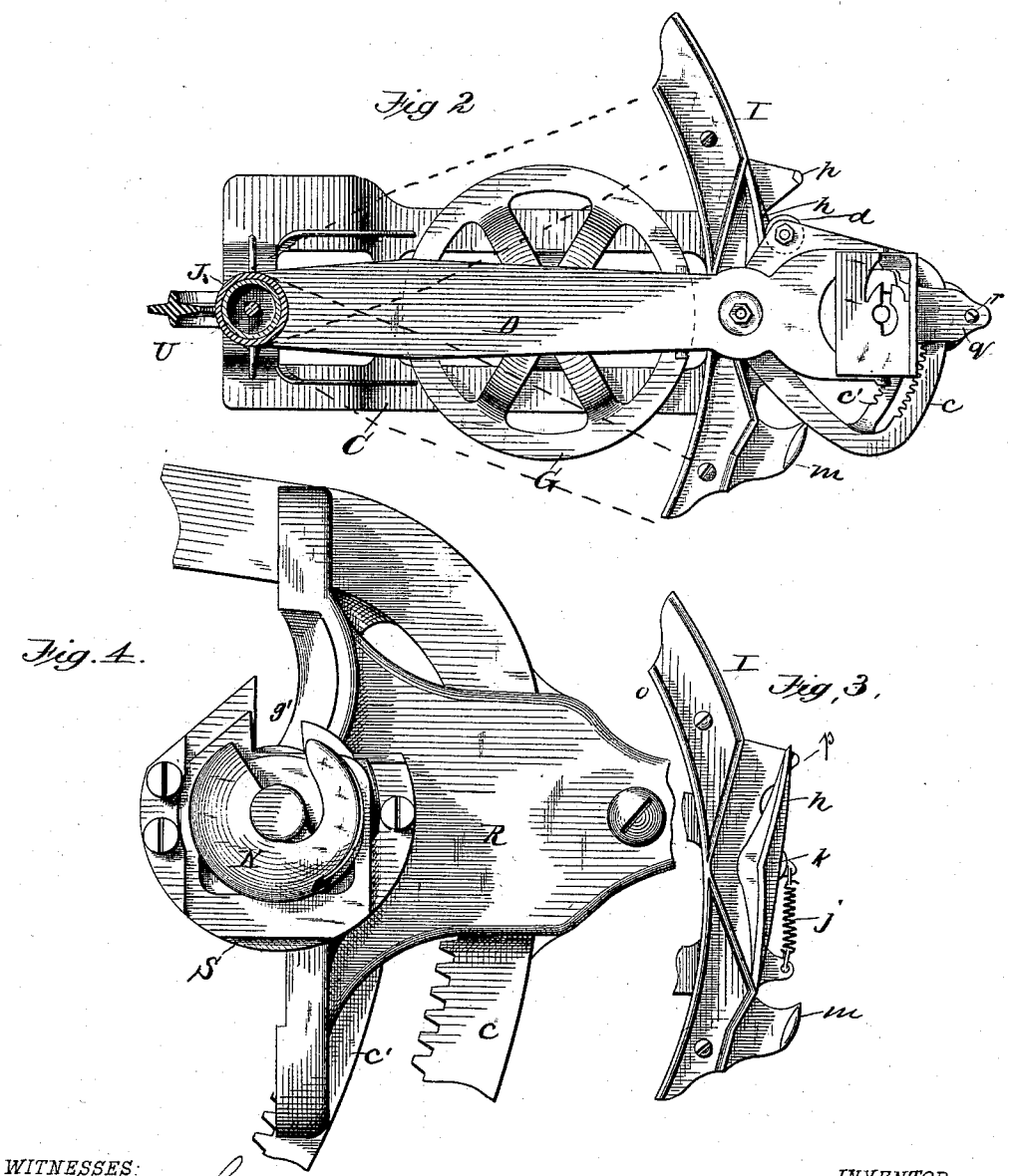
WITNESSES:
W. H. H. Knight
Newton Wyckoff
INVENTOR
James F. Gordon
By Philip T. Dodge
Attorney (Model.)
8 Sheets—Sheet 3.
J. F. GORDON.
GRAIN BINDING MACHINE.
No. 269,046. Patented Dec. 12, 1882.
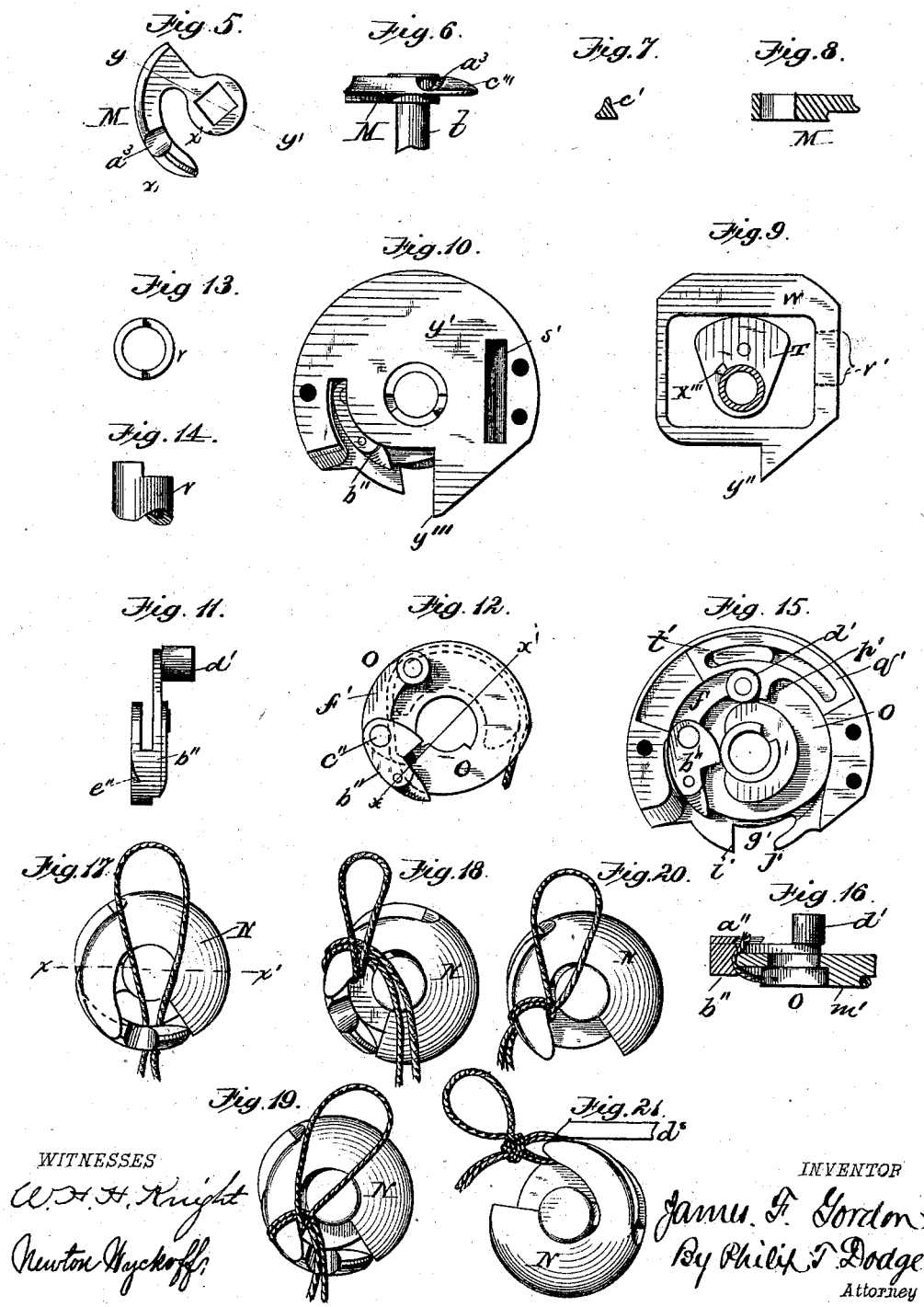
WITNESSES
W. H. H. Knight
Newton Wyckoff
INVENTOR
James F. Gordon
By Philip T. Dodge
Attorney (Model.)
J. F. GORDON.
GRAIN BINDING MACHINE.
No. 269,046.   Patented Dec. 12, 1882.
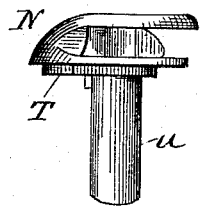
Fig. 22.
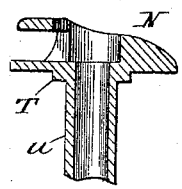
Fig. 23.
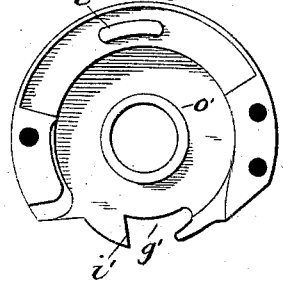
Fig. 24.
Fig. 25.
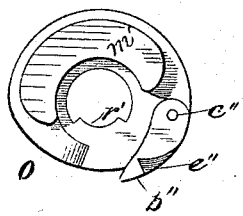
Fig. 26.
Fig. 27.
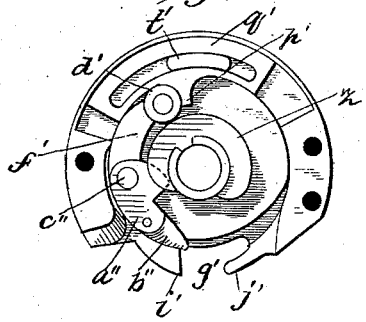
Fig. 28.
Fig. 28ª.
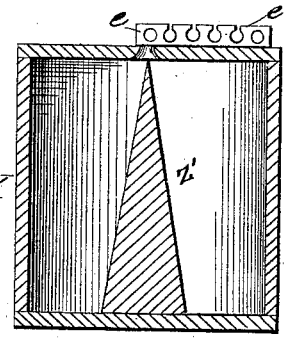
Fig. 38.
WITNESSES:
W. H. H. Knight
Newton Wyckoff
INVENTOR
James F. Gordon
By Philip T. Dodge,
Attorney.

(Model.)

8 Sheets—Sheet 5.

J. F. GORDON.
GRAIN BINDING MACHINE.

No. 269,046.                    Patented Dec. 12, 1882.

WITNESSES
W. H. Knight
Newton Wyckoff

INVENTOR
James F. Gordon
By Philip T. Dodge
Attorney (Model.)

J. F. GORDON.
GRAIN BINDING MACHINE.

No. 269,046. Patented Dec. 12, 1882.

WITNESSES
W. H. H. Knight
Newton Wyckoff

INVENTOR
James F. Gordon
By Philip T. Dodge
Attorney (Model.)
J. F. GORDON.
GRAIN BINDING MACHINE.
No. 269,046.          Patented Dec. 12, 1882.
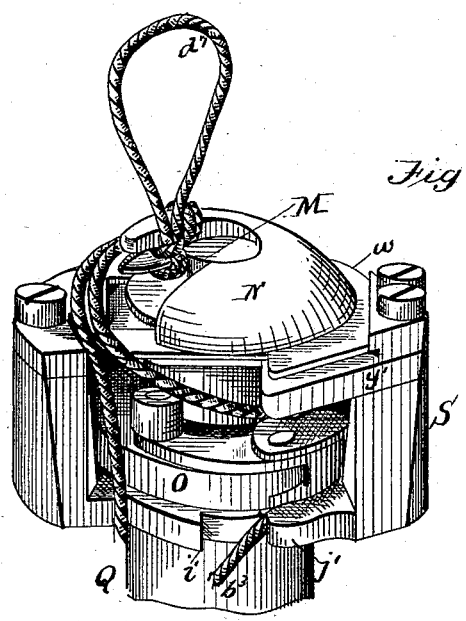
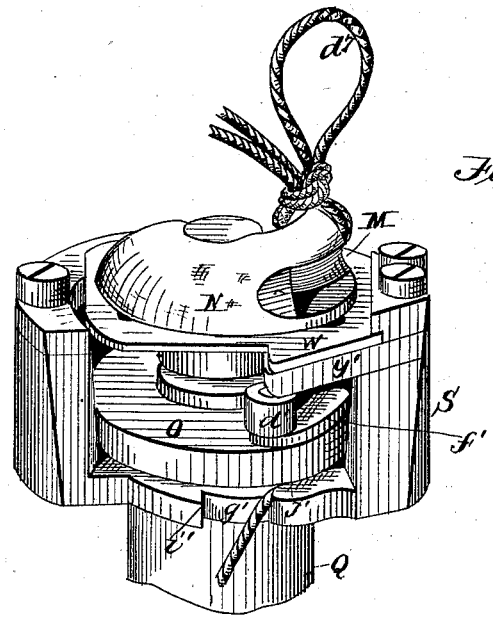
WITNESSES:
W. H. H. Knight
Newton Wyckoff
INVENTOR
James F. Gordon
By Philip T. Dodge
Attorney.

(Model.)　　　　　　　　　　　　　　　　　　　　8 Sheets—Sheet 8.
J. F. GORDON.
GRAIN BINDING MACHINE.
No. 269,046.　　　　　　　　　Patented Dec. 12, 1882.
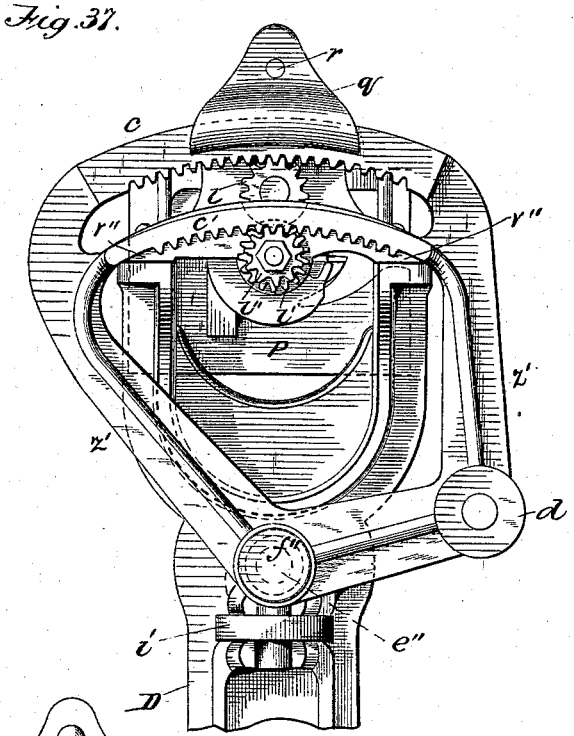
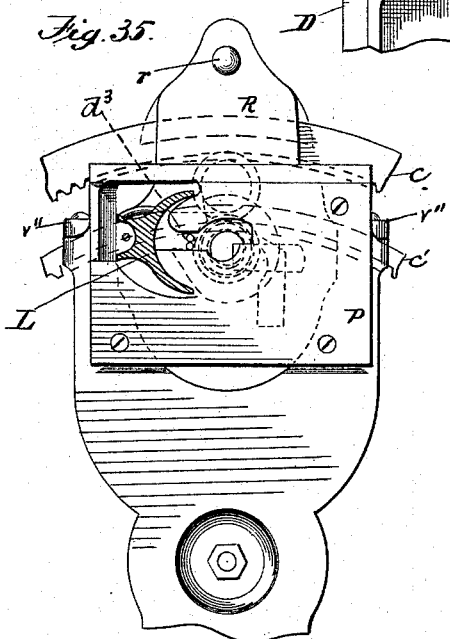
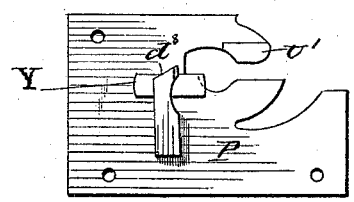
WITNESSES:　　　　　　　　　　　　　　　　　　INVENTOR
　　　　　　　　　　　　　　　　　　　　James F. Gordon
　　　　　　　　　　　　　　　　　　　By Philip T. Dodge
　　　　　　　　　　　　　　　　　　　　　　Attorney

UNITED STATES PATENT OFFICE.

JAMES F. GORDON, OF ROCHESTER, NEW YORK.

GRAIN-BINDING MACHINE.

SPECIFICATION forming part of Letters Patent No. 269,046, dated December 12, 1882.

Application filed October 5, 1882. (Model.)

*To all whom it may concern:*

Be it known that I, JAMES F. GORDON, of Rochester, in the county Monroe and State of New York, have invented certain Improvements in Grain-Binding Machines, of which the following is a specification.

My invention relates to improvements in grain-binders; and it consists in an improved knot-tyer, in the mechanical appliances for operating the same, and in an improved rotary cord-holder for retaining the end of the cord while the binding-arm encircles the gavel, and in certain details of construction and arrangement and combinations of devices, as hereinafter more fully set forth.

The invention also further consists in the employment of a vibrating rack or racks, so arranged as to impart to the knot-tyer both its forward and reverse rotation while the knot-tyer and its accessories are traveling in one and the same direction and permit it to remain practically at rest while traveling in the reverse direction.

The invention also further consists in the employment of a switch, in connection with the stationary cam-track, by which the racks are caused to make their vibrations during their forward motion only.

Figure 30:
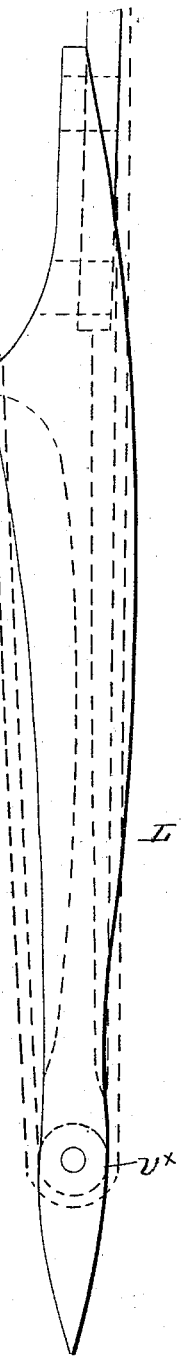

Referring to the accompanying drawings, Figure 1 is a side elevation of my improved grain-binding apparatus. Fig. 2 is a plan view of part of the same, the binding-arm being removed. Fig. 3 is a plan view of the cam track and switch. Figs. 4 to 8, inclusive, are detail views of my improved knot-tyer, Fig. 4 being a plan view of the same, Fig. 5 a plan view of the lower or looping hook, Fig. 6 an elevation of the same as seen from the left in Fig. 5, Figs. 7 and 8 sections of the same on lines $x\, x'$ and $y\, y'$, respectively, of Fig. 5. Fig. 9 shows the sliding plate and cam. Fig. 10 shows the knot-tyer as seen from above, the hooks and sliding plate being removed. Fig. 11 is a side view of the holding-jaw. Fig. 12 is a plan view of the rotating holder. Figs. 13 and 14 are respectively end and side views of the rotating-holder spindle. Figs. 15 and 28 represent different positions of the revolving holder and sliding stop. Fig. 16 is a section of the revolving holder on the line $x\, x'$, Fig. 12. Figs. 17, 18, 19, 20, and 21 are plan views of the revolving hooks, showing successive phases of the knot. Fig. 22 is an elevation of the upper revolving hook as seen from the left hand in Fig. 4. Fig. 23 is a section of the same on the line $x\, x'$, Fig. 17. Fig. 24 is a plan view of the knot-tyer casing, the working parts being removed. Fig. 25 is a view of the holding-jaw as seen from the inside. Fig. 26 is a reversed view of the revolving holder. Fig. 27 is a side elevation of the revolving cam for operating the holding-jaw. Fig. 28$^a$ is a view of the end of the clearer for forcing the looped cord over the ends of the hooks, thereby completing the knot. Fig. 29 is a vertical section through the knot-tyer on the line $x\, x'$, Fig. 17. Fig. 30 is a side view of the point of the binding-arm. Figs. 31, 32, 33, and 34 are perspective views, showing the successive positions of the knot-tyer in making the knot. Fig. 35 is a plan view of the knot-tyer and covering-plate. Fig. 36 is a reversed view of the covering-plate. Fig. 37 is a view of the end of the knot-tyer-supporting arm as seen from below, showing the vibrating racks and pinions for operating the knot-tyer and cord-holder.

In the accompanying drawings I have represented my present improvements as applied to a grain-binder of the well-known Gordon type, in which a horizontally and vertically moving binding-arm vibrates about a fixed axis at one end of the grain-receiver, in conjunction with a vibrating band-fastening mechanism located below the grain-table, as shown in my previous Patents No. 169,258, October 26, 1875; No. 194,817, September 4, 1877; No. 198,104, December 11, 1877; No. 210,319, November 26, 1878, and No. 210,520, December 3, 1878; but my present improvements, or some of them, are adapted for use in connection with other forms of grain-binders.

My improvements in grain-binders are illustrated in the accompanying drawings, in which—

A, Fig. 1, represents the bars or frame which supports the binding apparatus, and B B the brackets by which it is attached to the harvester. The binding apparatus is made capable of longitudinal adjustment on the frame A, for the purpose of placing the cord centrally about the gavel, in substantially the same manner as first shown in my Patent No. 77,878, May 12, 1868.

C is the main frame of the binding mechanism, which is supported by the frame or bars A, and is capable of longitudinal adjustment thereon.

D is the horizontally-vibrating arm which supports or carries the knot-tyer and its necessary adjuncts.

E is the vertically and horizontally vibrating binding-arm, which is pivoted in arms extending laterally from the hollow upright sleeve J of the arm D, which surrounds the hollow post U, Fig. 2, of the binder-frame.

H is the main driving-shaft of the binder mechanism, and $f$ the continuously-running loose sprocket-wheel (here shown clutched on the shaft H) by which the latter is driven from the mechanism of the harvester. Suitable motion is imparted to the binder-arm E and arm D from the shaft H by means of the bevel pinion and gear F and G, crank $a$, and connecting-link $b$, in a manner substantially similar to that first shown in my Patent No. 211,150, January 7, 1879. The knot-tyer-supporting arm D is caused to vibrate horizontally in unison with the vertical and horizontal movement of the binder-arm by means of a pin, $g$, Fig. 1, extending upward from the crank $a$ into a slot on the lower side of the arm D. The position of the vibrating arm D at either end of the vibration is represented in dotted lines in Fig. 2. The position of the binding-arm E, crank $a$, and connecting-link $b$, when the point of the binding-arm is engaged with the knot-tyer, is shown in dotted lines E' $a'$ $b'$, Fig. 1.

K is the box or receptacle for holding the ball of cord.

M and N are the rotating knotting-hooks, and O is the rotary cord holding the cutting device.

P is the covering-plate, located immediately above the knot-tyer.

I is the cam-track, for operating the segmental racks $c$ $c'$, by which motion is transmitted to the knotting hooks and holder.

Q is the standard of the knot-tyer, and S the casing which incloses the cord-holder.

The cam-track I is bolted to the end of the main frame C. The knotter-carrying arm D is supported on the cam-track, which is provided with a curved rib, $o$, on which the roller $i$ on the lower side of the arm D travels.

Machines constructed in accordance with my present invention are provided, as usual, with a grain-table, or receptacle for receiving the grain from the delivering mechanism, in a manner substantially similar to that shown in my Patent No. 211,150, before alluded to. A suitable curved slot is made in this table for the passage of the point L of the binding-arm through it.

The cam-track I is provided with a switch, $h$, pivoted at $k$, Fig. 3, and held in its normal position by a spring, $j$, for the purpose of causing the knot-tying mechanism to operate while the arm D is swinging away from the harvester and to allow it to remain at rest during the return motion of the arm D. The switch $h$ is pivoted, as before stated, at $k$ to the cam-track I, and is ordinarily held in the position shown in full lines in Fig. 3 by the spring $j$, which is secured at one end to an arm on the journal or pivot of the switch and at the other end to the binder-frame, so that the roller $d$, in passing from the inner to the outer end of the cam-track I, striking against the inner part of the switch $h$, will be compelled by it to swing inward toward the pivotal point of the arm D, thereby causing the frame carrying the segmental racks $c$ $c'$ to make a partial rotation about its pivot $e$, which motion is transmitted to the knot tying and holding mechanism by means of the pinions $l$, $l'$, and $l''$. (Shown in Figs. 29 and 37.) As the vibrating arm D continues its motion the roller $d$ comes in contact with the inclined portion $m$ of the cam-track I, by which it is again caused to swing inward for a short distance, thereby releasing the knot from the hooks after it is formed and allowing the discharge of the bundle from the grain-receiver. After the roller $d$ passes through between the cam and the outer end of the switch $h$ the spring $j$ returns the switch to its former position, and the roller, in moving back with the vibrating arm D, travels on the outside of the switch, so that in passing it during the return movement no motion is transmitted to the cord tying and holding mechanism, and the same remains inactive. As the roller $d$ passes the pivotal point $k$ it causes the switch to turn on its pivot, thus forming a continuous track for the roller during the whole of its return movement. Under this organization it will be observed that the knotting-hooks and cord-holder are caused to make both their forward and return revolutions while the vibrating carrying-arm is swinging in one direction, and remains at rest during its return movement, thus completing the knot while the arm is swinging outward, so as to permit the delivery of the bound bundle from the receiver as soon as the knotter-supporting arm has reached the extremity of its outward vibration. The motion of the switch $h$ about the pivot $k$ is limited by a stop, $p$, carried by an arm extending outward from the cam-track I, the stop serving to hold the switch in place under pressure of the roller $d$ and relieving its pivot of undue strain.

The standard Q of the knot-tyer is secured to the end of the vibrating arm D by suitable projecting lugs, $v''$, Fig. 37, bolted thereto. A flange, R, extends outward from the standard Q, and carries a stud, $s''$, Figs. 29 and 37, on which the intermediate pinion, $l$, is journaled, and also affords attachment at the outer end for the rack-guide $q$, which is secured to the flange by bolt $r$, and extends inward underneath the rack $c$, so as to support the same in its vibrations. The rack is freely movable laterally between the flange R and the guide $q$. The segment-racks $c$ $c'$ are connected together at each end, and attached to a suitably-shaped frame, $z'$ $z'$, Fig. 37, provided with a hub, $f''$, encircling the stud $e''$ on the vibrating arm D.

Figure 31:
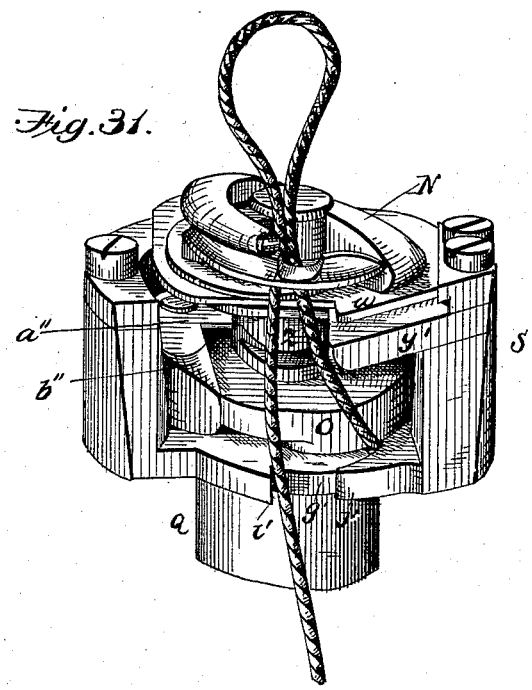
Figure 32:
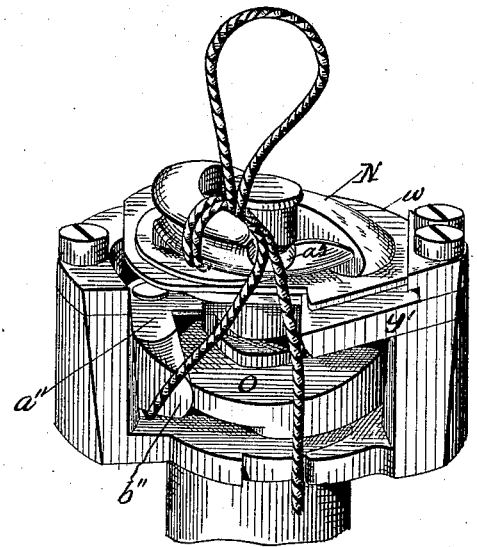

The frame and racks are preferably cast in one piece. The frame $z'$ $z'$ also carries the roller $d$. The rack $c'$ is placed lower than the rack $c$, to correspond with the relative positions of the pinions $l'$ $l''$, respectively, on the spindles of the knot tying and holding mechanism. The upper part of the standard Q of the knot-tyer is provided with an enlarged casing, S, forming a housing, within which the cord-holder O rotates. The vertical wall of the casing S is cut away on one side, as shown in Figs. 31 and 32, to permit the passage of the point L of the binding-arm between it and the side of the arm D, by which the cord is brought within the path of the hooks M and N and the rotary cord-holder O. The bottom of the casing S is provided with a notch, $g'$, on the side facing the binding-arm, the sides $i'$ and $j'$ of which serve to hold the cord in the proper position to be grasped in turn by the rotating hooks and holder. One side, $j'$, of the notch $g'$ is undercut, or made in the peculiar form represented in Fig. 15, so as to form the hook, which retains the cord within the notch during the forward movement of the holder and secures its proper adjustment around the same. The three spindles of the knot tyer and holder are journaled in the standard Q, the innermost one of which, $t$, is provided at its lower end with a pinion, $l''$, which engages with the rack $c'$, and has attached to its upper end the lower or looping hook, M, of the knot-tyer. The hollow spindle $u$, to the upper end of which the hook N is attached, immediately surrounds the spindle $t$, and has its bearing in the outer hollow spindle, $s$, of the rotary cord-holder O.

It will be observed that in consequence of the employment of the intermediate pinion, $l$, the knotting-hooks M and N and the rotary cord-holder O revolve in opposite directions about the same axis, and this I regard as an important feature of my present invention, as by this simple construction I am enabled to sever and firmly clamp the cord, and also to furnish sufficient cord to form the knot without drawing from the cord which encircles the gavel, thereby relieving the cord from excessive strain during the formation of the knot.

The rotary cord-holder O consists of a circular plate or disk, having pivoted to it on one side near the edge the holding-jaw $b''$, and provided on its lower side, a little back from the edge, with a projecting depending rib or lip, $m'$. The holder or disk O is connected with the hollow spindle $v$ in the following manner: The upper end of the hollow spindle $v$ is cut away around about one-half of its circumference, as represented in Figs. 13 and 14, and the disk is provided with a central circular opening of the same size as the outer diameter of the spindle $v$, having a lug, $r'$, projecting inward around about one-quarter of its circumference (more or less, as circumstances may require) to a distance corresponding with the thickness of the wall of the spindle, as shown in Fig. 16. The inner end of the lug $r'$ conforms to the circle of the circumference of the hollow spindle $u$ of the upper knotting-hook, and has a bearing against the same, which serves to hold it in position centrally. The object of this construction is to allow the holder to remain at rest at certain periods between its forward and reverse revolutions. The holder O is rotated by the projecting portion of the end of the spindle $v$ striking against the lug $r'$, and it will be perceived that in turning either way the spindle $v$ will make about a quarter of a revolution before commencing to move the holder O, which is for the purpose of retaining the slack of the cord until the knotter-hooks revolve far enough to begin to require it for the formation of the knot.

The holding-jaw $b''$ is pivoted to the margin of the disk O at $c''$, Figs. 12, 15, 26, and 28, and its arm $f'$, extending beyond the pivotal point $c''$, is provided with a small roller, $d'$, (see Figs. 11 and 25,) which bears against the rotary cam Z. The outer circumference of the holding-jaw is made circular in form, corresponding in size with the diameter of the inner walls of the casing S, in which it revolves, and has its forward end pointed, as shown in Figs. 10, 12, 26, and 28, thereby forming a hook to sieze the cord in its forward revolution.

The holding-jaw $b''$ is provided with a groove on its inner side, (see Figs. 16 and 25,) which, when the jaw is closed, overlaps the edge of the holder or disk O, as shown in Figs. 12, 16, and 26. The cord is held by pressure between the holding-jaw $b''$ and the disk O, the said pressure being obtained from the cam Z acting on the roller $d'$. The cam Z is attached to the inner hollow spindle, $u$, by the pin $x'''$, or in any other convenient manner, and rotates therewith, forcing the roller $d'$ outward from the axis of revolution and causing the holding-jaw $b''$ to compress the cord against the edge of the disk O. The holding-jaw $b''$ is provided on its upper side with a knife, $a''$, which in rotating severs the cord immediately after the jaw $b''$ has been closed by the action of the cam Z. The cam Z is provided with a groove, $n'$, through which the point of the knife $a''$ passes. This construction prevents the cord from slipping past and getting behind the point of the knife $a''$ when the jaw $b''$ is open. From the bottom of the casing containing the holder a hub, $o'$, Fig. 24, projects upward to a distance corresponding to the depth of the rib $m'$, and assists in supporting the holder O in place.

The holding-jaw $b''$ is provided on its outside with a notch, $e''$, Figs. 11 and 26, which prevents the cord from slipping off the point of the jaw during a portion of the backward motion of the holder O, as represented in Fig. 32, thus preventing the premature discharge of the end of the cord from between the jaw and the holder when the pressure of the cam is released. A sliding stop, $p'$, is arranged within the casing S to limit the motion of the holder O. The stop $p'$ is carried by a slotted curved plate, $q'$, and it projects into the recess formed for it in the casing S, so as to come in contact with the roller $d'$, being located immediately above the knife $a''$. The position of the plate $q'$ and stop $p'$ at the termination of the forward motion of the holder O is shown in Fig. 15, and the position of these parts at the end of the backward motion of the holder O is shown in Fig. 28. The plate $q'$ slides forward and back within a suitable curved opening in the casing S, a suitable guide, $t'$, being arranged in the slot in the plate.

The casing S may be made in one solid piece with the standard Q, or it may be built up in a number of pieces in any convenient way. On the top of the casing is placed a plate, $y'$, Fig. 10, having a central opening for the passage of the spindles $t$ and $u$, and being cut away, as represented in the drawings, to allow room for the free movement of the cord. A slot, $s'$, is made in the plate $y'$ to receive a guide-piece, $v'$, (shown in dotted lines in Fig. 9,) which projects downward from the sliding plate $w$, placed immediately above the top plate, $y'$, of the casing S. The sliding plate $w$ is arranged to slide horizontally on the top plate, $y'$, being operated by means of the cam T, Fig. 9. The cam T is fastened to the spindle $u$ by means of a pin, $x'''$, and revolves therewith. On the side toward the end the sliding plate $w$ is provided with a projection, $y''$, against which the cord is brought by the forward motion of the hook, as represented in Fig. 32. The plate $w$ serves to keep the cord from wedging under the knot-tyer. The plate $y'$ is also provided with a projecting point, $y'''$, which assists in keeping the cord in the proper position.

The knot-forming mechanism consists of two rotary hooks, M and N, which turn first in one direction and then in the other. The lower or looping hook, M, is rigidly secured to the innermost spindle, $t$, the upper end of which below its head is made square to fit into a similarly-shaped opening in the shank of the hook, as represented in the plan view Fig. 5. The hook N consists of an irregularly-shaped conical body portion on the end of a hollow spindle, $u$, $t$, and resting on the sliding plate $w$, its upper portion cut away on one side, and provided with a curved projecting finger and a horizontal recess in which the looping-hook M (which latter lies under the finger and in the recess in the said hook) is permitted to make a partial rotation. The hook N derives its motion from the lower or looping hook, M, which is driven from the rack $c'$ by means of the pinion $l''$, as hereinbefore described. It will be perceived that thus the hook M, on commencing to move in either direction, will execute a part of a rotation before starting the hook N. In its forward movement the point of the hook M, striking against the edge of the cut-away portion of the hook N, imparts motion to it in its backward movement. The hook M rotating in the recess in the hook N, revolves the latter when the outer end of its shank comes in contact with the end of the recess in the hook. A notch, $a^3$, is made in the upper side of the looping-hook M, the point of the hook being provided with a narrow projecting lug, $c'''$. It will be seen that the tyer-head resembles, to a certain extent in appearance, two disks having their edges made in the form of receiving-hooks, and that they differ widely in form from those heads which have projecting hooks or arms extended eccentrically from a small central hub.

The operation of forming the knot is performed as follows: The end of the cord being held between the disk O and the jaw $b''$, the spool portion of the cord is carried around the gavel by the point L of the binder-arm E and brought down alongside of the knot-tyer in the position represented by $d^3$, Fig. 35, within the path of rotation of the hooks. The point L of the binder-arm is curved sidewise, as represented in Fig. 30, for the purpose of compelling the cord to occupy the proper position with reference to the rotation of the hooks. The hook M now commences to rotate, and moving out of the slot in the hook N, its point incloses the cords between it and the lower or base portion of the hook N. This position of the hooks is shown in Figs. 17 and 31. Continuing to rotate, the point of the hook M strikes against the edge of the cut in the hook N, and, they both rotate together, making a complete revolution and looping the cords about them.

Fig. 18 represents the relative positions of the parts when they have completed the forward rotation. While the knotting-hooks have been rotating in the forward direction, the holder O has been rotating in the opposite direction and giving up to the knotting-hooks the amount of cord necessary to produce the knot on one of the cords, while the ball end of the cord has been receiving the slack from the ball of cord in the receptacle K through the tension device and around the roller $v^x$, Fig. 30, in the extremity of the point L. On the completion of the forward rotation of the hooks, the parts will occupy the positions shown in Figs. 19 and 32, the two cords having been drawn by the tension and the strain of the gavel into the recess $a^3$ in the looping-hook M. The looping-hook M now commences to rotate in the reverse direction, starting from right to left in Fig. 32. The lug $c^3$ on the point of the looping-hook carries the cord lying in the recess $a^3$ underneath the point of the upper hook, N, and through the loop in the cord formed by the previous rotation of the hooks. This position of the parts is indicated in Fig. 20. Continuing to revolve backward, the hook M compels the hook N to rotate backward, and the knot thus formed is forced off the point of the hooks by the stripper or clearer $d^8$, Figs. 21, 28$^a$, and 36, attached to the lower side of the covering-plate P. In the meantime the holder O, having completed its backward revolution, commences to revolve forward, when the jaw $b''$ immediately releases its hold on the end of the cord previously clamped between it and the disk O and grasps that portion of the cord last introduced by the descent of the binder-arm. Immediately thereafter the cord is severed by the cutting-knife $a''$, in consequence of the reverse rotation of the knot-tyer and holder straining it against the cutting-blade, thus permitting the completion of the knot and insuring a firm hold on the ball or spool end of the cord, which is now by the reverse rotation of the holder being wound around the depending rib $m$ of the holding-disk O to provide the slack for the formation of the succeeding knot. The rib $m'$ is made of the form as shown in Fig. 26 for the purpose of furnishing the slack at the proper time as required by the knotting-hooks. The shape of the rib $m'$ of the holder may be varied, as circumstances may require, to suit different forms of knot-tyers.

It will be observed that when the holding-jaw $b''$ is on the left-hand side of the knot-tyer, as shown in Fig. 32, the cord itself, being under strain from the rotation of the knotting-hooks, serves to keep the holding-jaw pressed tightly against the edge of the holder O, thereby securing the end of the cord firmly in place between the holder and the jaw. As the holding-jaw $b''$ moves toward the observer, (in Fig. 32,) it retains the cord firmly pressed against the holder until the cut-away portion of the cam Z comes opposite the roller $d'$, when the jaw is pulled open by the cord, which is now being drawn backward past the pivotal point $c''$ of the jaw by the reverse rotation of the knotting-hooks. The cord no longer presses the holding-jaw against the holder, but draws it open at the commencement of its forward revolution, thereby releasing the end of the cord and insuring the grasp of the succeeding cord by the point of the jaw, which is immediately closed by the continued rotation of the cam Z. The cutting of the cord by the knife $a''$ immediately succeeds the closing of the jaw by the rotary cam Z acting on the roller $d'$. The cam Z, being secured to the hollow spindle $u$ of the knotting-hook N, revolves in a direction opposite to that in which the holder revolves, in consequence of which the cut-away portion of the cam Z will twice pass the roller $d'$ during each complete forward and backward revolution of the hooks and the holder—once during the forward and once during the backward revolution. The walls of the casing S serve to keep the holding-jaw $b''$ clamped upon the cord while the back or outside of the holding-jaw is passing within the casing. When the back of the holding-jaw is outside the casing the jaw is part of the time held against the cord by the cam Z acting on the roller $d'$, and when the cam does not operate, by the cord pulling over the back of the holding-jaw, except at the commencement of the forward rotation of the holder, when the cord, having slipped backward to the pivotal point $c''$, draws the jaw open, as already explained.

In order to permit the cord to be placed within reach of the looping-hooks by the descent of the cord-carrying arm, the plate $y'$ is cut away on the side toward the arm, immediately above the notch $g'$, as shown in Fig. 10, so that the hooks project beyond it. An opening is also cut in the plate, on the left-hand side in Fig. 10, immediately above the holding-jaw $b''$ when at rest, for the purpose of affording sufficient room for the movement of the cord at the end of the formation of the knot, as shown in Fig. 33. The point $y'''$ of the plate $y'$, which projects into the concavity in the point L of the binder-arm, as shown in Fig. 35, prevents the cord from being carried too far to the left in Fig. 2 by the forward rotation of the knotting-hooks.

To prevent the cord from becoming wedged under the edge of the smaller portion of the conical base of the knotting-hook N, I provide the sliding plate $w$, which is interposed between the covering-plate $y'$ of the casing S and the base of the hook. A cam, T, Fig. 9, affixed eccentrically to the hollow spindle $u$ by the pin $x'''$ or other suitable means, revolves within an opening in the plate and causes it to reciprocate toward and away from the point of the binding-arm. The cam T is so placed with reference to the knotter-hooks that the plate $w$ is forced outward immediately after the knotting-hook N has commenced its forward rotation, so that the cord is held away from the reduced portion of the base of the hook N, as shown in Figs. 31 and 34, and is thereby prevented from wedging under its edge. The cord is also held in the proper position by the point $y''$ of the plate $w$, so that it slides easily over the upper surface of the conical body of the hook N, by which the formation of the knot is greatly assisted. Before the hooks have completed their forward revolution the plate $w$ is drawn back by the rotating of the cam T. It is again forced outward during the reverse revolution of the hooks, but at this time it performs no function, being withdrawn at the end of the reverse rotation of the hooks so as to permit the cord for the succeeding bundle to be placed by the binding-arm within reach of the knotting-hooks.

The needle or point L of the binding-arm is made of a curved tapering concave form, as shown in Figs. 29 and 30, for the purpose of placing the cord in its descent within the path of rotation of the point of the knotting-hooks, and is also provided on the opposite side with a small concavity, as shown in section in Fig. 35, for the purpose of preventing the cord from being wedged or cramped between it and the side of the knotter-carrying arms.

To prevent the cord from slipping over the point of the hook N at the termination of its forward movement, I provide the covering-plate P with a friction-piece, U', Figs. 35 and 36, which projects downward a short distance from the under side of the plate and bears against the upper side of the hook. This part of the plate is made yielding, for the purpose of providing friction to prevent the hook N from starting in either direction until the hook N comes in contact with the ends of the slot in the hook N. In the backward rotation of the hooks the cord is forced over the points thereof, in consequence of coming in contact with the stripper or clearer $d^2$, Figs. 21, 28ª, and 36, and the lug Y, which are located on the under side of the covering-plate P, in the path of rotation of the hooks, thus completing the knot after the end of the cord has been released from the holder and the spool end severed by the cutting-knife and clamped by the holding-jaw.

The operation of the clearer or scraper $d^3$ is represented in Fig. 21, and the position of the hooks at the completion of the knot, but before it is released, in Fig. 34. The clearer or scraper is provided at its point with a projecting tongue, (seen in the end view Fig. 28ª,) which projects into a groove made for it in the exterior of the revolving hooks, and prevents the cord from wedging between the scraper and the hook. The groove for the tongue of the scraper is shown at the right hand of the letter M in Fig. 29, in Fig. 31, and to the left hand of the letter M, Fig. 34. After the knot has been pushed over the point of the hooks by the scraper the loop thereof is released from between the hooks by the action of the roller $d$ striking against the incline $m$ of the cam-track, causing a partial forward rotation of the lower hook, M. As soon as the lug $c'''$ on the point of the hook M has emerged from below the point of the hook N the knot is released from the hooks and the sheaf is free to drop from the grain-receptacle. The hook N is prevented from rotating during this operation by the friction between it and the friction-plate U'. The bundle is released before the end of the outward vibration of the knotter-supporting arm D, and at the commencement of the return movement of the arm the hook M is returned under the hook N by the action of the cam $m$, thus leaving the hooks in position to grasp the cord of the next succeeding bundle.

The binding-cord is supplied to the knot-tyer from a ball placed within the box K, Fig. 1. From there it passes through a perforated plate, $e$; thence over a roller, $n$, on the binding-arm; thence back over a small roller, $s$, carried by a stationary arm, $y$, attached to the sleeve J. From thence the cord passes to a small roller, $v'''$, in the bend of the binding-arm, and thence downward over the back of the point L, around a small roller, $v^x$, Fig. 30, placed in the extremity of the point L. In threading up the machine the cord is passed through a small hole, $k'$, Fig. 29, in the upper margin of the circular portion of the point L. The perforated plate $e$ is for the purpose of affording a tension to the cord, which may be varied by passing the cord through more or less holes, as circumstances may require. I also apply an adjustable spring-tension to the roller $n$.

The different positions of the binding-cord are already clearly shown by the dotted lines $d^4$ $d^5$ $d^6$ in Fig. 1, the gavel being held in the loop $d^7$ during the binding operation. The arrangement of the rollers is such that in case there be no grain in the receptacle the binding-arm will descend without making a loop or becoming entangled with the binding-cord.

Instead of securing the cutter-blade to the holding-jaw $b''$, it might be secured to the cam Z with advantageous results.

It is evident that the employment of the intermediate pinion, $l$, may be dispensed with if the racks $c$ and $c'$ be located on opposite sides of the knotter-spindle.

The pinion $l''$ is attached to the spindle $t$ by a pin driven through the latter, the projecting ends of which enter notches in the pinion, which is further secured in place by the nuts $o''$, Fig. 29.

It is also evident that a pivoted arm operated by a cam or other suitable means to perform the function of forcing the cord away from the axis of rotation of the knotter may be substituted for the sliding plate $w$.

The stripper or clearer $d^3$ on the under side of the covering-plate P may be made yielding instead of rigid, being pivoted to the plate and provided with a spring for the purpose of facilitating the passage of the cord over the hooks.

The cord-receptacle is represented in section at K, Fig. 3. It has a top opening through which the cord is delivered to the cone Z', attached to the bottom, with its apex extended upward to enter or nearly enter at the opening. This device is not claimed herein, and the right is reserved to make the same the subject of a separate application.

The circumferential groove in the outside of the hooks M and N, instead of being cut in both, may all be made in the upper side of the looping-hook.

Having thus described my invention, what I claim is—

1. In a grain-binder, the combination of a traveling knot-tyer and operating mechanism, substantially as described, whereby a forward and reverse rotation is imparted to the tyer during the formation of the knot while it is traveling in one and the same direction.

2. In a grain-binder, the combination of a traveling knot-tying mechanism, a segmental vibrating rack, a stationary cam-track, and a switch in the cam-track, substantially as and for the purpose set forth.

3. In a grain-binder, the combination of traveling rotary knot-tying mechanism, a rotary cord-holder, a vibrating segment, a stationary cam-track, and a switch acting upon the segment, substantially as and for the purpose specified.

4. In a grain-binder, the combination of a rotary knot-tyer and a laterally-moving plate adapted to push and hold the cord away from the axis of rotation during the looping action of the tyer, substantially as described and shown, whereby the binding of the cord against the periphery of the tyer is prevented.

5. The combination of a rotary knot-tyer and a laterally-sliding plate, $w$, operated by the cam T, attached to the rotating knot-tyer spindle, substantially as and for the purpose set forth.

6. A knot-tying device consisting of a rotary vibrating hook, M, having the cord-retaining lug on its point, and the rotary vibrating hook N, arranged to permit the hook M to pass thereunder, so that the hook M shall overlap said lug in the manner described and shown.

7. The combination of the rotary vibrating hooks M and N, the point of the former arranged to advance across the cut or opening of the latter while looping the cord, whereby the entrance of the cord beneath the hook a second time is prevented.

8. In combination with the revolving disk O, the cord-holding jaw $b''$, straddling the edge of said disk and pivoted thereto, and the knife $a''$, mounted upon said holding-jaw, as described and shown.

9. In combination with the rotary knot-tyer, the rotary disk O and the jaw $b''$, pivoted to said disk, and arranged to engage with and retain the spool-cord previous to the severance of the band therefrom.

10. The sliding stop $p'$, in combination with the rotary disk or holder O, substantially as and for the purposes set forth.

11. The combination, with a knot-tyer, of the rotary disk O, having the cord-holding jaw $b''$ pivoted thereto, and the rotary jaw-operating cam Z, substantially as described.

12. The combination of the knot-tyer, the rotary disk O, the cord-holding jaw $b''$, a knife, $a''$, mounted upon the disk, and a cam, Z, arranged to operate upon the jaw, as described and shown.

13. The combination, with the knot-tyer, of the rotary disk O, the cord-holding jaw $b''$, knife $a''$, and cam Z, provided with groove $n'$, adapted to permit the passage of the knife, substantially as described.

14. The combination, with a knot-tyer, of the rotary disk O, the cord-holding jaw $b''$, pivoted thereto, and casing S, as described.

15. The rotary cord-holder O, arranged to receive the unsevered band, in combination with the hollow spindle $v$, pinion $l$, and operating devices, substantially as described, whereby the holder is caused to slacken or yield up the cord during the formation of the knot.

16. A cord-tying device consisting of two concentric independently-rotating discoidal parts, each having one edge cut away or recessed to form a hook therein, and having the remaining portion of its periphery concentric, or substantially concentric, with the axis of rotation, substantially as described, whereby they are adapted to perform the entire operation of looping the cord and passing the end through said loop.

17. The combination of the rotary cord-holder O, the spindle $v$, pinion $l$, pinion $l'$, and rack $c$, as described and shown.

18. The rotary cord-holder O, provided with the holding-jaw $b''$, loosely connected to the spindle $v$, substantially as described, whereby the cord-holder is permitted to remain at rest during the commencement of each forward and reverse rotation of the spindle, substantially as described.

19. The rotary cord-holder O, connected to the notched hollow spindle $v$ by the lug $r'$, bearing in the notch in the inner hollow spindle of the knot-tying head.

20. The combination of the rotary knot-tying hooks M and N, a rotary cord-holder, O, revolving within the casing S, substantially as described.

21. The rotary disk having the cord-holding device bearing upon its edge, in combination with the casing S, inclosing said disk, and provided in one edge with a recess having the projection $j'$ on one side to assist in guiding the cord.

22. The combination of the rotary knotting-hooks M and N, the casing S, the plate $y'$, having the cord-opposing projection $y'''$, substantially as and for the purpose set forth.

23. The combination of the concentric knotting-hooks M and N, having a limited independent motion, the cam-track I, provided with incline $m$, the rack-bar, and intermediate mechanism, substantially as described, for transmitting motion from the track to the rack-bar.

24. The vibrating racks $c$ and $c'$, located in different planes, in combination with the rotary knot-tying device, the rotary cord-holder O, and intermediate operating mechanism, substantially as described.

25. In combination with the concentric knotting-hooks M and N, the friction-piece U', located immediately over the upper surface of the hook N, and acting with a yielding pressure thereon.

26. The combination of the rotary knotting-hooks M and N and the stationary covering-plate having the friction-piece arranged to bear upon the hook N.

27. In combination with the rotary cord-carrier, the cord-holding jaw $b''$, pivoted thereto, and provided with the notch $e''$ in its edge, substantially as shown, whereby the cord is retained upon the outer side of the jaw.

28. The combination of the rotary hooks M and N, the friction-piece U', bearing upon the hook N, and the clearer $d^8$, and lug Y, for removing the loop from the hooks.

29. The combination of a rotary knot-tyer, an independent rotary device arranged to retain the spool end of the cord, and operating mechanism, substantially as described, whereby the rotary holder is caused to revolve and slacken the cord to the tyer during the formation of the knot.

JAMES F. GORDON.

Witnesses:
 GEO. B. SELDEN,
 H. G. PHILLIPS.